UNITED STATES PATENT OFFICE.

FRED M. LOCKE, OF VICTOR, NEW YORK.

ELECTRICAL INSULATOR.

1,233,486.    Specification of Letters Patent.    Patented July 17, 1917.

No Drawing.    Application filed August 22, 1916.    Serial No. 117,335.

*To all whom it may concern:*

Be it known that I, FRED M. LOCKE, a citizen of the United States of America, and a resident of Victor, in the county of Ontario, in the State of New York, have invented new and useful Improvements in Electrical Insulators, of which the following is a full, clear, and exact description.

This invention relates to certain improvements in insulators and the manufacture of the same and refers more particularly to a composition electrical insulation as a new article of manufacture and is closely related to the invention of Letters Patent Nos. 1,091,678, 1,091,679, 1,120,951, 1,127,042, 1,127,044, 1,156,163 issued to me.

The primary object of the invention is to produce an electrical insulator particularly adapted for conductors of high potential, and with this purpose in view to produce a homogeneous fused composition mass for insulating purposes of high inductive capacity, dielectric strength and resistance to puncture or disintegration by an electric current, and of low coefficient of expansion, and to attain this object by the use of a boron glass of high silica content without the fusing temperature of the mass being raised to such an extent as to preclude economical production.

A further object is to produce a more stable and permanent boron glass of high silica content.

The following are examples of the compositions of several insulators made in accordance with this invention:

|  | A. | B. | C. |
|---|---|---|---|
| $SiO_2$ | % 71 | % 75 | % 70 |
| $B_2O_3$ | 28 | 15 | 13 |
| $Li_2O$ | 1 | 1 | 9 |
| $Al_2O_3$ |  | 5 | 2 |
| $Na_2O$ |  | 4 |  |
| $Sb_2O_3$ |  |  | 6 |

The expansion co-efficient of composition "A" above named, is approximately .0000029, of B .0000040, and of C .0000056. It will be noted that all of the above compositions contain a comparatively large percentage of boric oxid; and that all of them are borosilicates.

Insulators made from compositions of the formulæ above given are extremely efficient both with high and low voltage currents and for other insulating purposes whether manufactured in the form of tubing, disks or otherwise by reason of their low co-efficient of expansion, their stability and their other electrical qualities.

The presence of alumina is useful in preventing crystallization during melting and working.

I have discovered that the addition of a nitrate, as for instance, nitrate of an alkali, such as, potassium nitrate or sodium nitrate, to the mix in manufacturing the insulator results in the production of a substantially pure white transparent glass at lower fusion temperature while the appearance of the insulator and its value under varying conditions is improved. For instance, a mix of the following parts: 80 parts silica, 10 parts boric acid, 5 parts potassium nitrate, 5 parts sodium nitrate, 10 parts cryolite, and 1 part lepidolite, will produce an insulator of high efficiency and of pleasing appearance and having a coefficient of expansion of approximately .0000030.

I desire to claim herein the addition to a combination of silica, boric oxid and lithia of a small amount of an alkali and a nitrate and I desire to claim the lepidolite in the combination as a lithia carrying material and cryolite as a halogen carrying material. I may use cryolite as a flux and an alumina-carrying material owing to the affinity of the elements of the halogen group such as, fluorine for silica and alumina, and by the use of cryolite, I am enabled to form a mass of high silica content into a homogeneous body at a relatively low heat.

In certain cases magnesia may be used as a substitute for lithia.

I claim:

1. An electric insulator of a composition consisting of silica, boric oxid, alumina, lithia, and an alkali, and having a coefficient of expansion of less than .0000056.

2. An electric insulator of a composition consisting of silica, boric oxid, alumina, lithia, and an alkali.

3. An electric insulator having a coefficient of expansion of less than .0000056, and comprising the following ingredients: silica, boric oxid, lithia, and alumina.

4. An electric insulator comprising the following ingredients: silica, boric oxid, lithia and alumina.

5. An electric insulator comprising the following ingredients: silica, boric oxid, and lithia, fused together to form a homogeneous body and having a coefficient of expansion of less than .0000056.

6. An electric insulator comprising the following ingredients: silica, boric oxid, and lithia, fused together to form a homogeneous body.

7. An electric insulator formed by fusing silica, boron, oxid, lithia, alumina, and a nitrate of an alkali metal to form a homogeneous body having a coefficient of expansion of less than .0000056.

8. An electric insulator formed by fusing silica, boron oxid, lithia, alumina material, and a nitrate of an alkali metal to form a homogeneous body.

9. An insulator formed by fusing silica, boron oxid, lithia, and a nitrate of an alkali metal to form a homogeneous body having a coefficient of expansion of less than .0000056.

10. An insulator formed by fusing silica, boron oxid, lithia, and a nitrate of an alkali metal to form a homogeneous body.

11. An electric insulator of a composition consisting of boric oxid, alumina, lithia, an alkali and at least 70% of silica.

12. An electric insulator comprising the following ingredients: boric oxid, lithia, alumina and at least 70% of silica.

13. An electric insulator comprising the following ingredients: boric oxid, lithia, and at least 70% of silica fused together to form a homogeneous body.

In witness whereof I have hereunto set my hand this 19th day of August 1916

FRED M. LOCKE.

Witnesses:
E. O. THOMPSON,
BERTHA N. SWART.